United States Patent [19]

Gaul et al.

[11] Patent Number: 4,961,636

[45] Date of Patent: Oct. 9, 1990

[54] REVOLVING NOSE PIECE FOR OPTICAL COMPONENTS AND PROCESS FOR ADJUSTING THE NUMBER OF REVOLUTIONS THEREOF

[75] Inventors: Norbert Gaul, Solms; Guenter Reinheimer, Biebertal; Peter Weimar, Staufenberg, all of Fed. Rep. of Germany

[73] Assignee: Ernst Leitz Wetzlar GmbH, Wetzlar, Fed. Rep. of Germany

[21] Appl. No.: 276,048

[22] PCT Filed: Feb. 18, 1988

[86] PCT No.: PCT/DE88/00080

§ 371 Date: Nov. 9, 1988

§ 102(e) Date: Nov. 9, 1988

[87] PCT Pub. No.: WO88/07217

PCT Pub. Date: Sep. 22, 1988

[30] Foreign Application Priority Data

Mar. 9, 1987 [DE] Fed. Rep. of Germany ....... 3707593
Apr. 8, 1987 [DE] Fed. Rep. of Germany ....... 3711843

[51] Int. Cl.⁵ .......................... G02B 21/00; G02B 7/02
[52] U.S. Cl. ..................................... 350/520; 350/254
[58] Field of Search ............... 350/507, 520, 522, 414, 350/254

[56] References Cited

U.S. PATENT DOCUMENTS

| 3,458,706 | 7/1969 | Ravenhall et al. .................... 250/219 |
| 4,486,078 | 12/1984 | Hashimoto et al. .................. 350/520 |
| 4,544,236 | 10/1985 | Endo .................................... 350/247 |
| 4,586,794 | 5/1986 | Bierleutgeb et al. ................ 350/520 |

FOREIGN PATENT DOCUMENTS

| 1547374 | 12/1969 | Fed. Rep. of Germany. |
| 3240401 | 5/1983 | Fed. Rep. of Germany. |
| 0242104 | 1/1987 | German Democratic Rep. ..................................... 350/254 |
| 55-6905 | 2/1980 | Japan. |
| 60-45214 | 3/1985 | Japan. |
| 60-118817 | 6/1985 | Japan. |
| 2187905 | 9/1987 | United Kingdom ................ 350/254 |

OTHER PUBLICATIONS

Patent Abstracts of Japan, vol. 9, No. 167 (P-372), (1890), Jul. 12, 1985, (60-45214).
Patent Abstracts of Japan, vol. 9, No. 273 (P-401), (1996), Oct. 30, 1985, (60-118817).

Primary Examiner—Bruce Y. Arnold
Assistant Examiner—Ronald M. Kachmarik
Attorney, Agent, or Firm—Foley & Lardner, Schwartz, Jeffery, Schwaab, Mack, Blumenthal & Evans

[57] ABSTRACT

A description is given of a rotating turret device, which has a number of optical components, for example, lenses, condensors, filters and stops, which may be brought into operating position individually in each case. Apart from a motor drive device (1-4), an encoding device (12a-12c; 24a-24c) for the indexing or preselection of a specific optical component to be brought into operating position, and locating means (7, 7a; 8) for positioning the optical component in operating position, the rotating device has, in additiion, marking and control means (13; 13a), with the aid of which the speed of the turret can be controlled as a function of its particular relative position. In particular, it is possible with the device described to bring a high-speed motor-driven turret (5) into a set location, there taking place shortly before attainment of this operating position a controlled braking of the rotational speed of the turret (5). Moreover, the microscope turret (5) is decoupled from the motor drive device (1-4), which comprises an electromotor (1) and a tachometer generator (1a), so that the exact attainment of the operating position takes place in a purely mechanical fashion through locating means (7, 7a; 8).

Moreover, a procedure is given for controlling the speed of the rotating turret device.

15 Claims, 3 Drawing Sheets

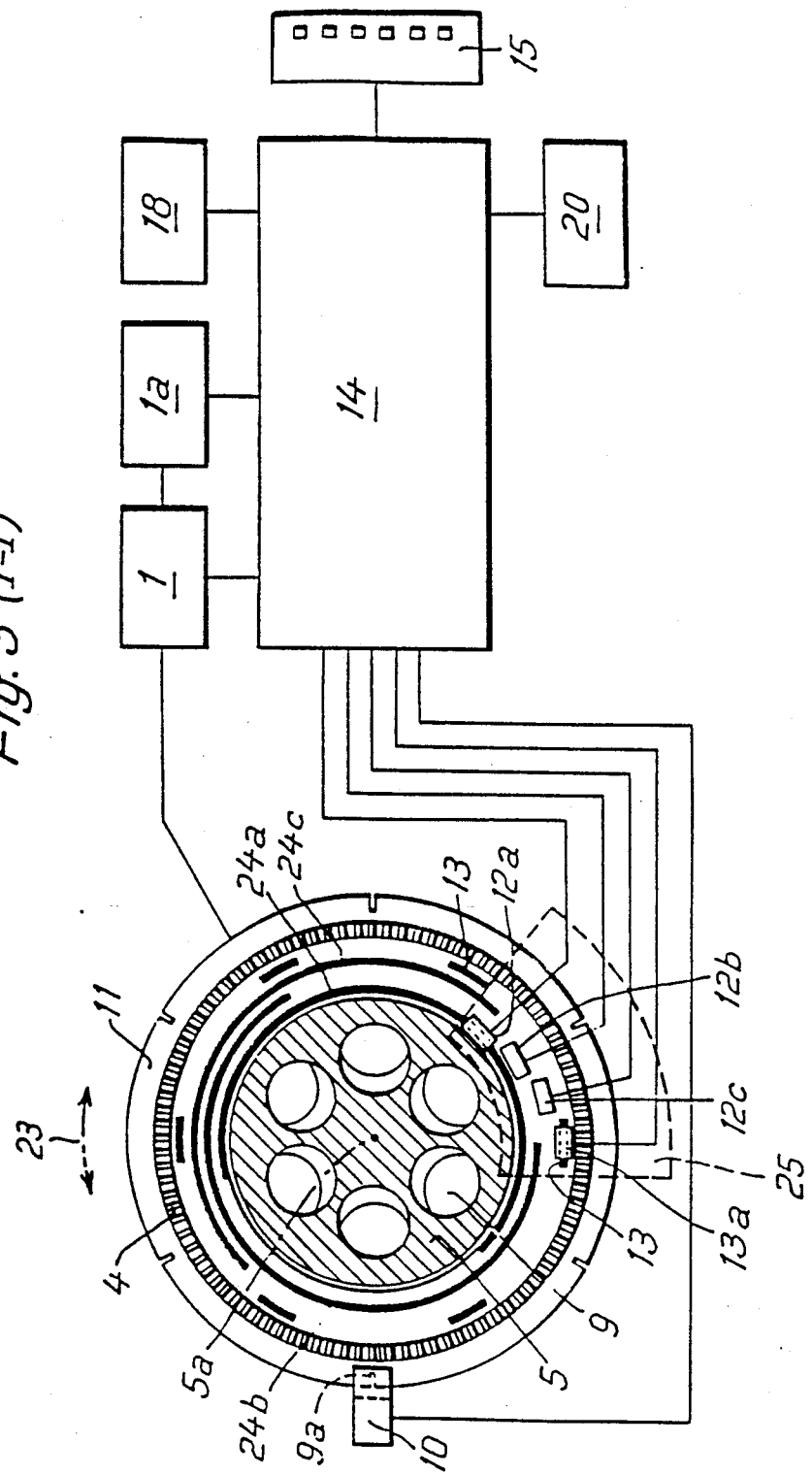
Fig. 3 (r-1)

REVOLVING NOSE PIECE FOR OPTICAL COMPONENTS AND PROCESS FOR ADJUSTING THE NUMBER OF REVOLUTIONS THEREOF

BACKGROUND OF THE INVENTION

1. Field of the Invention

The invention relates to a rotating turret device with a number of optical components for optical instruments, especially microscopes, it being possible for the optical components to be brought into operating position individually in each case. In the present case, optical components are taken to be, first and foremost, lenses, condensers, filters, stops, or beam-deflecting components.

2. Description of the Prior Art

Owing to increasing automation in the construction of microscopic instruments, cf., for example, microanalytical instruments or special microscopes for the semiconductor industry, motor-driven lens turrets, for example, are already known. In this connection, a desired lens is brought into operating position by means of a signal, which is generated by appropriately positioned light barriers (sensors) or contacts (microswitches). It is also already known to code lenses attached to a motor-driven microscope turret in such a way that a specified lens can be brought into operating position as desired.

Thus, there is known from German Offenlegungsschrift No. 3,240,401, for example, a rotating device which has a series of lenses of different magnifications. This known device contains encodings on the periphery of the turret, and, further, light barriers and peripheral positioning notches as well as mechanical locating means.

Moreover, the Japanese patent notification document 55-6905 already contains a description of a turret arrangement which carries a number of color filters on a rotating plate. Additionally, markings in the form of "ramps" are provided, which correspond to appropriate microswitches. The microswitches have different radial intervals from the center point of the rotating plate.

Moreover, there is known from U.S. Pat. No. 3,358,706 a device which has a rotating disc, on one side of which concentrically arranged encoding means are attached at different radial intervals. Optical means on a mount opposite the disc-namely lamps and photodiodes-cooperate with non-reflecting or reflecting encoding means.

However, all known motor-switchable turret mounts for optical components have the disadvantage that the switching time between a turret eye located in operating position and an adjacent other turret eye to be brought into operating position is relatively long. Especially with regard to a turret for microscope lenses which must be equipped with up to six and more lenses, the problem of mass means that the switch-over time from turret eye to turret eye becomes disproportionately large because of the fact that the known mechanical locating means are no longer capable of absorbing the accelerating forces which arise. For this reason, it has been necessary so far to operate with an ever slower turret speed as more equipment is added to the turret. This represents a very disadvantageous effect, which becomes especially evident in timeconsuming routine inspections.

SUMMARY OF THE INVENTION

Accordingly, it is the object of the present invention to provide a rotating turret device which, despite a denser equipping with optical components and a resultant increase in the total mass, enables the optical components which are to be brought into operating position in each case to be positioned in substantially shorter switch-over intervals. A further subsidiary object consists in indicating a procedure for controlling the speed of a rotating turret device as a function of position.

In accomplishing the foregoing objects, there has been provided according to one aspect of the present invention a rotating turret device with a number of optical components in which each optical component can be brought into operating position individually, comprising a turret having an axis, a motor drive, an encoding device for the indexing or pre-selection of a specific optical component which is to be brought into operating position, locating means for positioning the optical component in operating position, and marking means for marking the location of the turret and controlling the speed of the turret as a function of its particular relative location with regard to a pre-selected location of the operating position, wherein the motor drive device comprises an electromotor with a coupled tachometer generator, which device is connected with the turret.

In accordance with another aspect of the invention, there has been provided a procedure for controlling the speed of such a rotating turret device, comprising the step of changing the speed as a function of the particular actual location of the turret with respect to its preselected location of the operating position, wherein, when the turret speed has been reduced as a consequence of braking the turret triggered by the marking means and the sensor, a locating sphere runs into a capture region, a stop sensor then reduces the speed to zero in cooperation with a mark, and, in order to ensure a purely mechanical engagement, the motor drive device is decoupled from the turret.

Further objects, features and advantages of the present invention will become apparent from the detailed description of the preferred emboidments which follows, when considered together with the attached drawings. Further embodiments follow from the subclaims.

BRIEF DESCRIPTION OF THE DRAWINGS

FIG. 3: shows a plan view along the section I—I (of FIG. 2) with additional functional connections to the control electronics etc.

DESCRIPTION OF THE PREFERRED EMBODIMENTS

Figure 1:
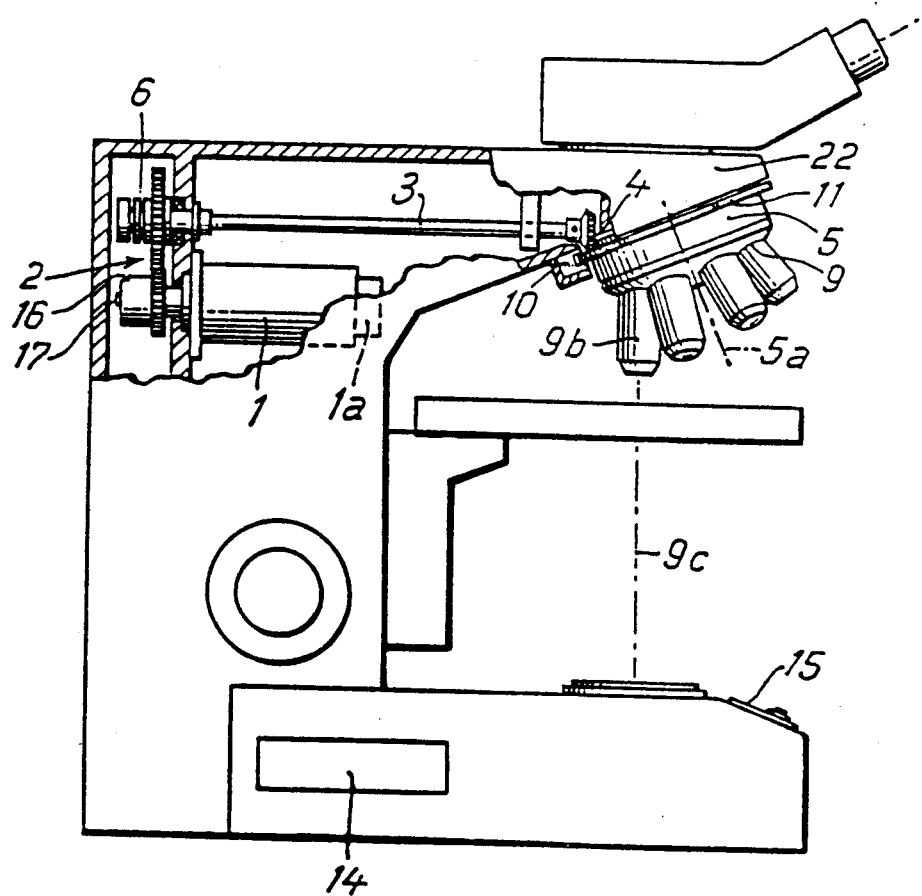
FIG. 1: shows the side view of a complete microscope with a drive device for the lens turret.

FIG. 1 shows a microscope in side view. Arranged in the housing part is an electromotor 1, which is coupled to a tachometer generator 1a. Attached to the axis 17 of the electromotor 1 is a gear wheel, which cooperates with a further gear wheel, which is arranged on a connecting axis 3, a safety clutch 6 being interpolated on safety grounds. Via the connecting axis 3, which is connected to a turret gear 4, this gear 2 actuates the turret 5 which is equipped with 6 lenses in the case represented, of which four lenses with different magnification stages are shown in FIG. 1. Only the lens 9b which is located in operating position is given a reference numeral in the figures. The location of operating position or the "set location" of the lens 9b is reached when the lens axis coincides with the optical axis 9c of the microscope. The lenses are mounted exchangeably in a known way in the turret eyes 9, cf. Fig. 3. As with the labelling of all lenses present on the turret 5, with the labelling of the six revolver eyes, as well, on grounds of simplicity only one eye is provided with the reference numeral 9.

Figure 2:
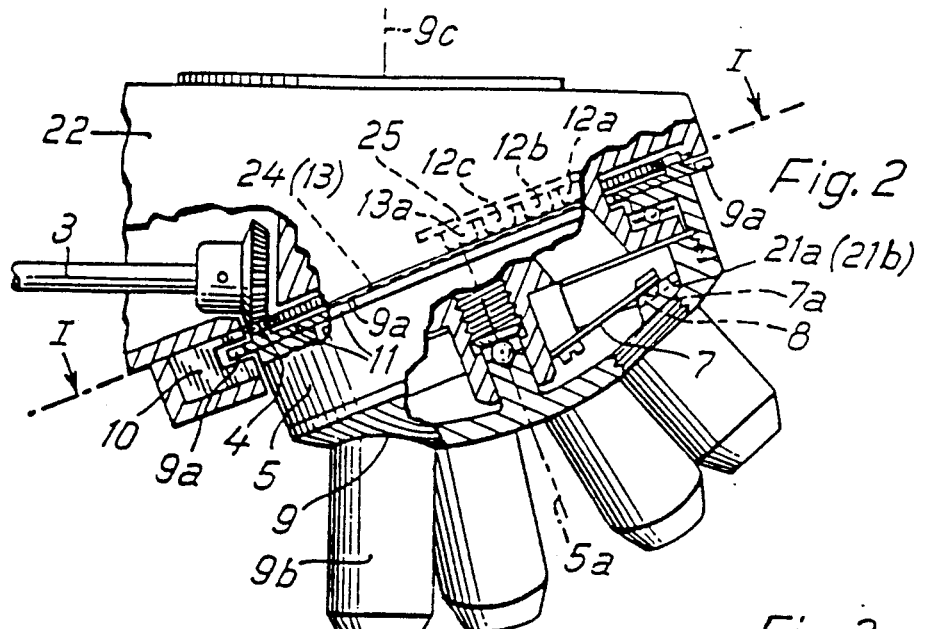
FIG. 2: shows an enlarged detailed representation of the lens turret.

The turret 5, which is arranged to rotate about the turret axis 5a on the microscope arm 22, has a coded disc 11. Recognizable in FIG. 3, which represents a plan view of a section along the line I—I of FIG. 2, is the coded disc 11, which has six notch markings in its peripheral region. Once again, only one mark 9a of these markings is provided with a reference numeral. This mark 9a labels the set location of the turret eye 9 or of the lens 9b. Corresponding correlative relationships apply with regard to the marks which are offset respectively by 60° and to the associated turret eyes or the lenses. The double arrow 23 is intended to indicate that the turret 5 can be rotated in both directions of rotation- in accordance with the shortest resetting path in each case. Located on the coded disc 11 which is connected rigidly to the turret 5, there are, then, located an inner coded tape 24a, a middle coded tape 24b and an outer coded tape 24c, which are all arranged concentrically around the point of emergence of the turret axis 5a-but with a different radial interval in each case. In this connection this may be circular track sections of highly reflective material. However, other tape allocations - for example, magnetic - are also conceivable. The choice of the coded tape material depends on the type of code sensors 12a-12c (optical sensors or magnetic sensors) assigned to these tapes 24a-24c. The code sensors 12a, 12b, 12c are arranged on a sensor plate 25, which is rigidly connected to the microscope arm. The sensor plate 25 is represented with dashed lines in FIG. 3 as an annular sectional surface. With the aid of this encoding device 12a-12c, 24a24c, it is possible to undertake an indexing or a pre-selection of a specific lens to be brought into operating position. To this end, the code sensors 12a-12c are connected to control electronics 14, which are either accommodated in the base of the microscope housing, cf. FIG. 1, or can, however, be constructed as external control device. The control electronics 14 are connected to a keyboard 15 directly, or via a connecting lead. It is also possible to arrange the keyboard 15 on or at the base of the microscope, as shown in FIG. 1. It has, for example, six individual keys, one key being assigned, in each case, to one of the six lenses. The control electronics 14 are further connected to a power pack 18, which ensures the power supply. Moreover, they can be connected to a remote control connection 20. Again, there is a connection to the electromotor 1 as well as to the tachometer generator 1a. Finally, the stop sensor 10 is connected directly to the control electronics 14. The stop sensor 10, which can be constructed as light barrier, is held immovably on the microscope arm 22, as emerges from FIG. 2.

Located further on the coded disc are six marking means 13, which are arranged in a circularly symmetric fashion around the point of emergence 5a, and at identical intermediate intervals in each case. Once again, here, too only one marking means 13 has been provided with a reference numeral: it is that marking means which cooperates with a further sensor 13a in the position represented in FIG. 3. The sensor 13a is likewise attached to the sensor plate 25, cf. also FIG. 2. In functional cooperation with the control electronics 14 and the stop sensor 10 or the six marks 9a, this so-called "slow" sensor 13a, together with the associated six "slow" marking means 13, represent the actual subject-matter of the invention.

The functional sequence is now as follows: the set location of the turret 5 specified by the keyboard 15 or the remote control connection 20 is compared with the aid of the code sensors 12a12c ("actual location") and the control electronics 14 and then there is sent to the electromotor 1 a voltage signal, the polarity of which agrees with the direction of rotation 23 in which the turret 5 or its turret eye 9 must run in order to reach its pre-selected set target by the shortest route therefore as quickly as possible.

Figure 2A:
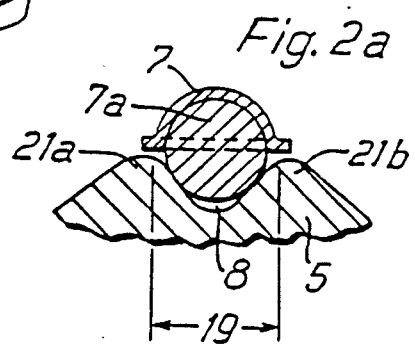
FIG. 2a: shows a further enlarged detailed view of the locating means and of the so-called capture region.
Figure 1A:
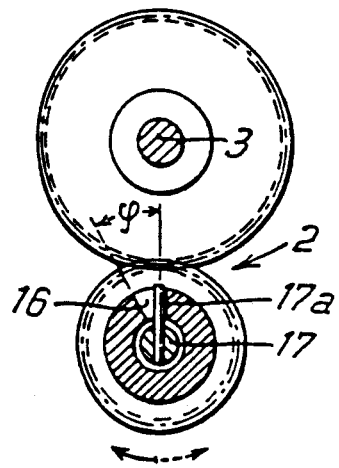
FIG. 1a, 1b: shows an enlarged detailed view of the gear in plan view (FIG. 1a) and side view (FIG. 1b)
Figure 1B:
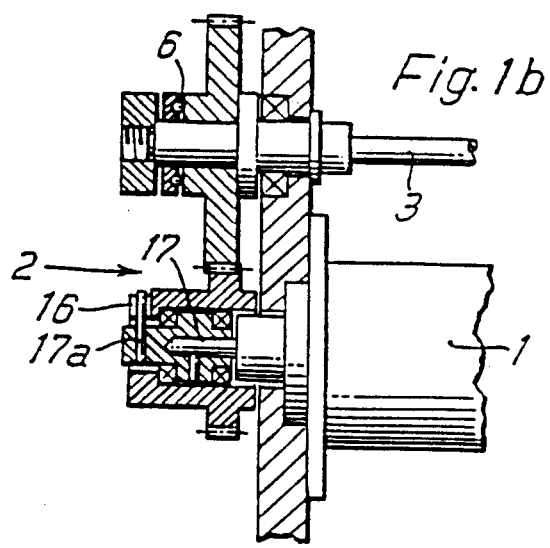

If the turret 5 is in the vicinity of such a location, the slow marking 13 comes into operation with the slow sensor 13a and reduces the speed of the electromotor 1 which is controlled by the connected tachometer generator 1a. In this way, a braking is brought about immediately before the actual mechanical engagement process. The locating sphere 7a now runs with reduced speed into the so-called "capture region" 19 of the mechanical locating arrangement. This capture region 19 is represented in more detail in FIG. 2a. This figure shows, in greatly enlarged representation, the valley-shaped locating notch 8, which is surrounded by two ridges which are represented in FIG. 2a as domes 21a and 21b. The capture region 19 is that region which arises between the two slopes on the valley side (thus: those directed towards the locating notch 8). If the locating sphere 7a is in this capture region 19, the electromotor 1 is decoupled from the lens turret by means of a decoupling device 16, 17a , so that the last part of the route to the actual set location-thus, from the dome 21a to the valley region (locating notch 8)-is carried out in a purely mechanical fashion by the pressure of the locating spring 7 or of the locating sphere 7a on the valley side flank of the dome 21a. In this locating position, the mark 9a on the coded disc 11 is in operating position with respect to the stop sensor 10, which then entirely switches off the electromotor 1 via the control electronics 14. Consequently, the accuracy of the locating arrangement is determined purely mechanically. This means that the disadvantages are excluded which have up to now been present with motor-driven positioning of a turret, in that the motor was permanently non-positively connected to the turret. Since each sensor-and therefore also the stop sensor 10 has a certain functional region (also: "capture region") with respect to the mark 9a, a control in which exclusively optoelectric components are used would not be exact enough. Accordingly, it is proposed according to the invention to construct the rotating device in such a way that, or to cause the positioning procedure to take place in such a way that the critical last stretch of the route takes place in a purely mechanical fashion, the non-positive connection between the electromotor 1 and the turret 5 having been cancelled. For the short rotation route, the electromotor 1 is decoupled from the lens turret 5 by means of the drive pin 17a and the drive slot 16-cf. FIG. 1a. It is possible in this way to attain an accurate operating position which is free from arbitary errors of placement.

Moreover, with the device according to the invention it is possible to perform automatic correction of desired or undesired manual resettings of the lens turret. To this end, a comparison of actual and set values is made periodically by the control electronics 14. A correction immediately takes place if the locating sphere 7a has left the capture region of the stop sensor 10. It is possible in this way automatically to countermand a manual intervention-that is a turning of the lens turret. The energy for the control electronics 14 and the electromotor 1 or the tachometer generator 1a is supplied by the power pack 18.

The device described makes it possible for heavily equipped rotating devices for optical instruments to be positioned in a pre-selectable fashion with high precision and at high speed. Moreover, instances of faulty operation can be detected in a simple fashion, and automatically countermanded. It is also possible, for example, to combine a rotating turret device for microscope lenses with an analogous rotating turret device for microscope condensers or for optical filters or stops, etc. In this connection, it is also possible for disc-shaped rotating devices ("rotary tables")-for example, for filters or stops-to be used instead of the classic turret form for lenses shown in FIGS. 1 and 2. Finally, the device can be so constructed that instead of a rotating device a linear slide is provided as carrier of a multiplicity of optical components for example, of splitting mirrors or deflection prisms-it then being possible for the codings described to be arranged in an analogous fashion in the longitudinal direction of the slide.

List of reference numerals

1-Electromotor
1a-Tachometer generator
2-Gear
3-Connecting axis
4-Turret gear
5-Turret
5a-Turret axis
6-Safety clutch
7-Locating spring
7a-Locating sphere
8-Locating notch
9-Turret eye
9a-Mark
9b-Lens
9c-Optical axis of the microscope
10-Stop sensor
11-Coded disc
12a, 12b, 12c-Code sensor at (5)
13-("Slow") marking means
13a-("Slow") sensor
14-Control electronics
15-Keyboard
16-Drive slot
17-Axis of (1)
17a-Drive pin
18-Power pack
19-Capture region (of the mechanical locating arrangement)
20-Remote control connection
21a, 21b-Domes on (5)
22- Microscope arm
23-Double arrow (turret rotation directions)
24a, 24b, 24c-Coded tapes
25-Sensor plate

We claim:

1. Rotating turret device with a number of optical components in which each optical component can be brought into operating position individually, comprising:
    (a) a turret having an axis;
    (b) an encoding device for the indexing or pre-selection of a specific optical component to be brought into operating position,
    (d) locating means for positioning the optical component in operating position,; and
    (e) marking means for marking the location of the turret and controlling the speed of the turret as a function of its particular relative location with regard to a pre-selected location of the operating position, wherein the motor drive device comprises an electromotor with a coupled tachometer generator, which device is connected with the turret.

2. Rotating turret device as claimed in claim 1, wherein the marking means are arranged on a coded disc attached to the turret, each of said marking means being assigned to a respective turret eye or to an respective optical component insertible in the turret eye, and wherein the means for controlling the speed comprise an immovably held sensor which functions in cooperation with the marking means, and with an electronic control system and the motor drive device to execute a reduction of the speed of the turret.

3. Rotating turret device as claimed in claim 2, wherein the marking means are arranged on the coded disc along a circular line concentric with the turret axis.

4. Rotating turret device as claimed in claim 2, wherein the marking means are arranged on the outer surface of the turret.

5. Rotating turret device as claimed in claim 2, wherein said optical component comprises a lens.

6. Rotating turret device as claimed in claim 2, wherein the means for controlling the speed executes a reduction of the speed of the turret immediately before attainment of the preselected location.

7. Rotating turret device as claimed in claim 1, wherein the marking means are arranged on a coded disc attached to the turret.

8. Rotating turret device as claimed in claim 7, wherein the marking means are arranged along a circular line concentric with the turret axis.

9. Rotating turret device as claimed in claim 1 wherein the marking means are arranged on the outer surface of the turret.

10. Rotating turret device as claimed in claim 1, wherein the motor drive device has a safety clutch, and the electromotor has a decoupling device which comprises a drive slot and a drive pin.

11. Rotating turret device as claimed in claim 1, further comprising means defining a plurality of locating notches, each of said notch-defining means comprising two domeshaped ridges and each notch being assigned to one of said optical components.

12. Procedure for controlling the speed of the rotating turret device as claimed in claim 1, as a function of the particular actual location of the turret with respect to its pre-selected location of the operating position, wherein, when the turret speed has been reduced as a consequence of braking the turret triggered by the marking means and the sensor, a locating sphere runs into a capture region, a stop sensor then reduces the speed to zero in cooperation with a mark, and, in order to ensure a purely mechanical engagement, the motor drive device is decoupled from the turret.

13. Procedure as claimed in claim 12, wherein a reduction of speed takes place immediately before attainment of the actual location of the operating position.

14. Procedure as claimed in claim 12, further comprising automatically returning the turret to its specified set location after having been reset manually therefrom, making a comparison of actual and set values of the turret position at periodic intervals, and supplying an appropriate signal to the drive device.

15. Rotating turret device as claimed in claim 1, wherein the motor drive device is connected with the turret via a first gear, a connecting axle and a second gear.

* * * * *